United States Patent
Guruprasad et al.

(10) Patent No.: US 10,756,797 B2
(45) Date of Patent: Aug. 25, 2020

(54) ADAPTIVE ANTENNA SELECTION

(71) Applicant: APPLE INC., Cupertino, CA (US)

(72) Inventors: Medini Guruprasad, Santa Clara, CA (US); Alejandro J. Marquez, Sunnyvale, CA (US); Shang-Te Yang, San Jose, CA (US); Mohit Narang, Cupertino, CA (US); Indranil S. Sen, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 16/128,867

(22) Filed: Sep. 12, 2018

(65) Prior Publication Data
US 2019/0103905 A1 Apr. 4, 2019

Related U.S. Application Data

(60) Provisional application No. 62/565,901, filed on Sep. 29, 2017.

(51) Int. Cl.
| | |
|---|---|
| H04B 7/06 | (2006.01) |
| H04B 17/26 | (2015.01) |
| H04W 48/20 | (2009.01) |
| H04B 7/0413 | (2017.01) |
| H04B 17/318 | (2015.01) |
| H04W 84/18 | (2009.01) |

(52) U.S. Cl.
CPC ........ H04B 7/0608 (2013.01); H04B 7/0413 (2013.01); H04B 17/26 (2015.01); H04B 17/318 (2015.01); H04W 48/20 (2013.01); H04W 84/18 (2013.01)

(58) Field of Classification Search
CPC .. H04B 7/0608; H04B 17/318; H04B 7/0413; H04B 17/26; H04W 48/20; H04W 84/18
See application file for complete search history.

(56) References Cited

U.S. PATENT DOCUMENTS

| | | | | |
|---|---|---|---|---|
| 8,390,514 B1* | 3/2013 | Baker | ...................... | H01Q 3/40 |
| | | | | 342/368 |
| 2003/0174700 A1* | 9/2003 | Ofek | ....................... | H04L 47/10 |
| | | | | 370/389 |
| 2008/0165721 A1* | 7/2008 | Fujii | ..................... | H04L 1/1854 |
| | | | | 370/315 |
| 2014/0233665 A1* | 8/2014 | Clevorn | .................. | H04B 7/04 |
| | | | | 375/267 |
| 2016/0227350 A1* | 8/2016 | Zhang | ................ | H04L 61/6022 |

* cited by examiner

*Primary Examiner* — Walter J Divito
(74) *Attorney, Agent, or Firm* — Fay Kaplun & Marcin, LLP

(57) ABSTRACT

A user equipment (UE) including at least two antennas configured to allow the UE to communicate via a first connection. The UE selects a connection performance parameter associated with the first connection, generates historical measurement information for the at least two antennas based on the connection performance parameter, for the plurality of antennas, the historical measurement information indicating an expected performance associated with using a selected one of the at least two antennas for a packet transmission and selects, based at least on the historical measurement information, one of the at least two antennas for use in transmitting the packet.

20 Claims, 5 Drawing Sheets

ADAPTIVE ANTENNA SELECTION

PRIORITY/INCORPORATION BY REFERENCE

This application claims priority to U.S. Provisional Application 62/565,901 entitled "Adaptive Antenna Selection," filed on Sep. 29, 2017, the entirety of which is incorporated herein by reference.

BACKGROUND INFORMATION

A user equipment (UE) may be configured with a variety of different wireless communications capabilities. For example, the UE may be capable of establishing a wireless connection with another UE via a short-range communication protocol, such as Bluetooth. To improve the Bluetooth connection, the UE may utilize antenna diversity, in which two or more antennas are available for use in establishing the Bluetooth connection. For example, when a first antenna fails in exchanging a packet over the Bluetooth connection, it may be assumed that the performance of the first antenna under current conditions is poor. Thus, the UE may select the second antenna to attempt to exchange the packet.

When a plurality of antennas is available, there are a variety of different ways that the Bluetooth antenna may be selected. In a first example, a first conventional selection mechanism may be to always select either a first Bluetooth antenna or a second Bluetooth antenna. Thus, regardless of the availability of another Bluetooth antenna, the UE is configured to only select the first Bluetooth antenna or vice versa. In a second example, a second conventional mechanism may utilize a blind switch selection where a first Bluetooth antenna (e.g., a default selection) is selected. Thereafter, whenever there is a packet drop or some other failure event, the UE blindly switches to the second Bluetooth antenna. The second Bluetooth antenna may be used until another packet drop or failure event occurs, upon which the first Bluetooth antenna is again selected. The switch may occur frequently (e.g., for one or more attempts associated with a single packet exchange) or may occur occasionally (e.g., after a plurality of packets are exchanged using the first Bluetooth antenna after which a packet drop occurs that causes the blind switch to the second Bluetooth antenna). However, all of these conventional selection mechanisms have drawbacks associated with exchanging packets.

SUMMARY

In one exemplary embodiment, a method is performed by a user equipment (UE) including at least two antennas configured to allow the UE to communicate via a first connection. The method includes selecting a connection performance parameter associated with the first connection, generating historical measurement information for the at least two antennas based on the connection performance parameter, for the plurality of antennas, the historical measurement information indicating an expected performance associated with using a selected one of the at least two antennas for a packet transmission and selecting, based at least on the historical measurement information, one of the at least two antennas for use in transmitting the packet.

In a further exemplary embodiment, a user equipment (UE) has a transceiver configured to establish a first connection and an antenna arrangement comprising at least two antennas, each of the at least two antennas configured to communicate via the first connection. The UE further includes a processor configured to select a connection performance parameter associated with the first connection, the processor further configured to generate historical measurement information for the at least two antennas based on the connection performance parameter, the historical measurement information indicating an expected performance associated with using a selected one of the at least two antennas for a packet transmission, the processor further configured to select, based at least on the historical measurement information, one of the at least two antennas for use in transmitting the packet.

In a still further exemplary embodiment, a method is performed by a user equipment (UE) including at least two antennas configured to allow the UE to communicate via a first connection. The method includes determining whether historical measurement information includes at least a predetermined minimum amount of packet transmissions, when the historical measurement information includes less than the predetermined minimum amount of packet transmissions, performing at least one further packet transmission until the historical measurement information includes at least the predetermined minimum amount of packet transmissions, wherein the historical measurement information is used, at least in part, to select one of the at least two antennas for an additional packet transmission, the historical measurement information indicating an expected performance associated with using the one of the at least two antennas for the additional packet transmission.

DETAILED DESCRIPTION

Figure 1:
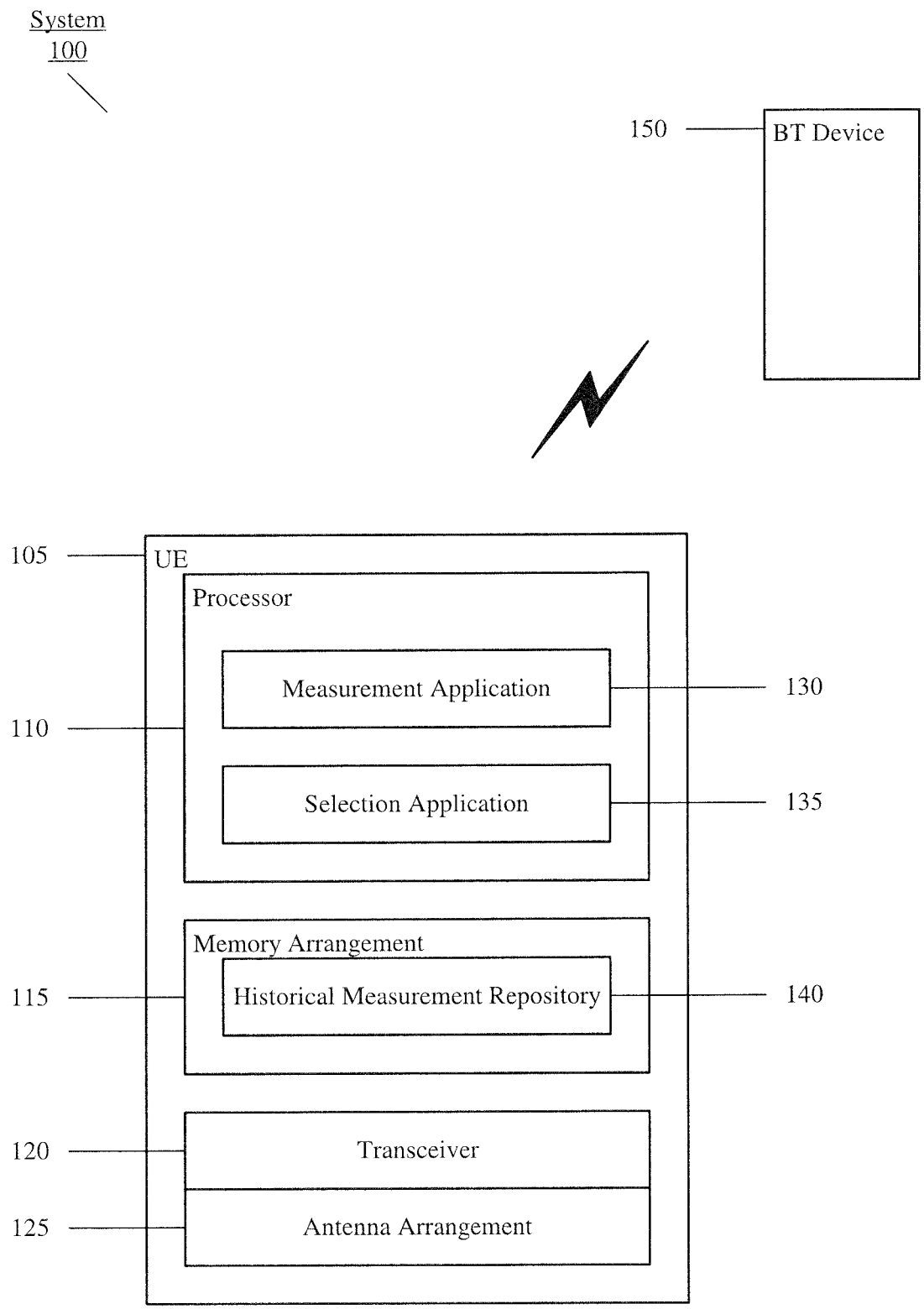
FIG. 1 shows an example system in which a user equipment adaptively selects an antenna according to various exemplary embodiments described herein.

The exemplary embodiments may be further understood with reference to the following description and the related appended drawings, wherein like elements are provided with the same reference numerals. The exemplary embodiments are related to a device, system, and method for adaptively selecting an antenna of a user equipment (UE) for use in a data exchange over a wireless connection. The wireless connection may be established using any protocol, but examples are provided with respect to a short-range communication protocol, such as Bluetooth. The exemplary UE may utilize antenna diversity, in which more than one Bluetooth antenna is available to exchange data over the wireless connection. The exemplary embodiments provide an overall mechanism in which the selection of the Bluetooth antenna considers historical measurement information obtained using a tracking mechanism for a plurality of packets so that an adaptive selection mechanism for the Bluetooth antennas may be used for one or more subsequent packets. The historical measurement information may indicate an expected performance of a Bluetooth antenna.

Initially, it should be noted that the exemplary embodiments are described with regard to a Bluetooth wireless connection, for which the antenna selection is performed. However, the use of a Bluetooth connection and performing the antenna selection for this wireless connection is only exemplary. The exemplary embodiments may be modified to be used with any type of short-range wireless connection. The exemplary embodiments may be further modified or implemented for use with other wireless connections, such as medium- and/or long-range wireless connections.

It should also be noted that the exemplary embodiments are described with regard to an antenna diversity technique in which the Bluetooth connection may be established using one of two antennas. However, the use of two antennas is only exemplary. The exemplary embodiments may be configured, modified, or implemented for use with any arrangement of two or more antennas, e.g., any of which that are used to establish the Bluetooth connection.

Although a particular conventional antenna selection mechanism may provide sufficient performance at a given time, external factors may affect the performance achieved under the conventional selection mechanism. For example, interference from one or more other wireless connections may alter the communication environment at any given moment. Therefore, a capability to dynamically select which antenna to use for any given packet exchange offers advantages over conventional strict (or constrained) selection mechanisms (such as forced or blind selection). These advantages may include fewer packet drops, increased power saving, better user experience, and/or overall improved performance efficiency.

Therefore, when the UE has two (or more) Bluetooth antennas and an option is available to select between the Bluetooth antennas, the exemplary embodiments provide an adaptive selection mechanism where the UE dynamically selects the Bluetooth antenna based on historical measurement information. The exemplary adaptive antenna selection mechanisms may be implemented at any time and for any duration. For example, the adaptive antenna selection mechanisms may be implemented from the start of a connection or in response to a condition, such as a reduced connection (or link) performance, e.g., as measured by one or more performance factors. Further, the adaptive antenna selection mechanisms can be suspended at any time during a connection, such as when connection performance increases above a performance threshold. Thus, the adaptive antenna selection mechanisms can be selectively implemented when desired for improved performance and selectively suspended, e.g., to conserve battery power. The historical measurement information may be gathered for a predetermined minimum number of packet exchanges prior to a current packet exchange for which a selection of a Bluetooth antenna is to be performed. The exemplary embodiments may utilize a tracking mechanism for the predetermined minimum number of packet exchanges. The tracking mechanism may continue to be used such that a sliding window relative to the current packet exchange defines the predetermined minimum number of packet exchanges that provide the historical measurement information. In this manner, the historical measurement information may be a relatively recent performance history that is contemporary for the current packet exchange. By being configured to utilize the historical measurement information, the adaptive selection mechanism enables an informed determination as to which Bluetooth antenna is to be used for the current packet exchange. Alternatively or additionally, a predetermined duration can be used to obtain historical measurement information.

FIG. 1 shows a system 100 where a UE 105 adaptively selects a Bluetooth antenna according to various exemplary embodiments described herein. The system 100 includes the UE 105 that communicates over a Bluetooth connection with a Bluetooth device 150. For example, the UE 105 may be a portable device (e.g., cellular phone, a smartphone, a tablet, a phablet, laptop, a wearable, an Internet of Things (IoT) device, etc.) or a stationary device (e.g., a desktop terminal). The Bluetooth device 150 may be another portable or stationary device (e.g., ear buds, another smartphone, an earpiece, a headset, a speaker, a display device, etc.).

The UE 105 may operate on a variety of different frequencies or channels (e.g., range of continuous frequencies or sets of frequencies). Specifically, the UE 105 may operate over channels corresponding to a Bluetooth connection. The UE 105 may also utilize other types of wireless connections and operate on further channels such as those corresponding to a cellular connection (e.g., LTE, 5G, 4G, etc.), a WiFi connection, etc. As shown in FIG. 1, the UE 105 may include a processor 110, a memory arrangement 115, and a transceiver 120 utilizing an antenna arrangement 125. However, the UE 105 may also include further components such as a display device, an input/output (I/O) device, and other components such as a portable power supply, an audio I/O device, etc.

The processor 110 may be configured to execute a plurality of applications of the UE 105. For example, the applications may include a web browser when connected to a communication network via the transceiver 120. Accordingly, data may be exchanged with the network. In another example, the applications may include an audio application where audio data is exchanged between the UE 105 and the Bluetooth device 150 over the Bluetooth connection. In yet another example, the applications may include a measurement application 130 that is configured to measure one or more connection parameters. For example, the measurement application 130 may determine one or more performance measures associated with a connection, such as a received signal strength indicator (RSSI), a packet error rate (PER), a bit error rate (BER), etc. It is noted that the use of a particular performance measure, e.g., RSSI, is only exemplary and any performance measure or combination of performance measures may be used. The measurement application 130 and the exemplary embodiments may utilize a different type of connection parameter or standard upon which a quality of the connection (e.g., the Bluetooth connection) is determined. The applications also may include a selection application 135 that is configured to initially determine whether a default antenna selection mechanism is to be used based on current conditions being experienced by the UE 105. When the selection application 135 determines that the features of the exemplary embodiments are to be used, the selection application 135 may determine which of the Bluetooth antennas is to be selected in performing a data communication over the Bluetooth connection. Thus, the selection application 135 may determine when a default selection mechanism is to be used or when the adaptive selection mechanism is to be used, as well as when the tracking mechanism is to be used. The selection application 135 may also perform the operations associated with these mechanisms. In some implementations, the tracking mechanism may be used continuously while a connection is active. In other implementations, the tracking mechanism may be selectively engaged, e.g., when one or more performance measures indicate decreased performance. A threshold for engaging tracking can be different from a threshold for performing the adaptive antenna selection, e.g., so that the historical samples are already populated when adaptive antenna selection is initiated.

In some implementations, the functionality described for the measurement 130 and selection 135 applications may also be represented as components of one or more multi-functional programs, a separate incorporated component of the UE 105, or may be a modular component coupled to the UE 105, e.g., an integrated circuit with or without firmware. That is, the applications may be implemented in a variety of manners in hardware, software, firmware, or a combination thereof. In addition, in some UEs, the functionality described for the processor 105 is split among two or more processors, e.g., a baseband processor and an applications processor. The exemplary embodiments may be implemented in any of these or other configurations of a UE.

The memory arrangement 115 may be a hardware component configured to store data related to operations performed by the UE 105. Specifically, the memory arrangement 115 may store measurements or tracking information of operations associated with wireless connections. As the measurement application 130 measures the RSSI value (and/or other performance measures) at different times (e.g., when a packet exchange is performed/attempted), the memory arrangement 115 may store the measurements in a historical measurement repository 140. As will be described in further detail below, the historical measurement repository 140 may store RSSI values (and/or other performance measures) and corresponding information (e.g., frequency at which the packet exchange is performed/attempted, result of a packet exchange attempt, etc.). In this manner, based on a current packet exchange, the selection application 135 may refer to the historical measurement repository 140 to identify historical performance metrics for the Bluetooth antennas.

The transceiver 120 may be a component of the UE 105 that enables communication with other devices over one or more communication pathways. Specifically, the transceiver 120 may enable wireless communications to be performed. As the exemplary embodiments relate to the UE 105 being capable of a Bluetooth connection, the transceiver 120 may be equipped with one or more radios that are capable of performing wireless communications over the Bluetooth connection. It is again noted that the UE 105 may be capable of further types of wireless connections, such as a cellular connection, a WiFi connection, another type of short range connection, etc. Accordingly, the transceiver 120 may be configured to enable these types of wireless connections.

The antenna arrangement 125 may be any configuration of two or more antennas that enable the transceiver 120 to perform the wireless communications over the Bluetooth connection. The antenna arrangement 125 may be configured such that any of the two or more antennas may be used to transmit a packet via the Bluetooth connection.

By way of example, the antenna arrangement 125 may include three different antennas: an upper antenna configured for both a WiFi connection and a Bluetooth connection, a first lower antenna configured for a cellular connection (hereinafter referred to as "lower cellular antenna"), and a second lower antenna configured for the Bluetooth connection (hereinafter referred to as "lower Bluetooth antenna"). Since the upper antenna is configured for both the WiFi and Bluetooth connections (e.g., using orthogonality), while the upper antenna is used for the WiFi connection, the upper antenna is referred hereinafter as "upper WiFi antenna" and while the upper antenna is used for the Bluetooth connection, the upper antenna is referred hereinafter as "upper Bluetooth antenna". Accordingly, the antenna arrangement 125 including the three antennas may provide two Bluetooth antennas, the upper Bluetooth antenna and the lower Bluetooth antenna. In other implementations, other numbers and arrangements of antennas, including those supporting Bluetooth, can be used.

It is noted that the first and second Bluetooth antennas are referred to herein as the upper and lower Bluetooth antennas. However, the relative disposition of the Bluetooth antennas in the UE 105 is only exemplary. That is, the first and second Bluetooth antennas may be positioned at any relative location. For example, in another exemplary embodiment of the antenna arrangement 125, a first Bluetooth antenna may be disposed on a left edge while a second Bluetooth antenna may be disposed on an opposite right edge. Therefore, the upper and lower dispositions utilized herein are exemplary only and any relative orientation and configuration of two or more antennas may be used.

According to the exemplary embodiments, the UE 105 may be configured to adaptively select the Bluetooth antenna between, e.g., the upper Bluetooth antenna and the lower Bluetooth antenna, to improve the wireless communications over the Bluetooth connection. As described above, the UE 105 may utilize historical measurement information stored in the historical measurement repository 140 based on measurements performed by the measurement application 130. Initially, as noted above, the selection application 135 may be configured to perform a variety of operations to make determinations regarding various decisions in selecting the appropriate mechanism at the proper time. One such determination relates to when the features of the exemplary embodiments are to be utilized. As described above, the exemplary embodiments of the adaptive antenna selection may be used in conjunction with other types of antenna selection such as those described above. Thus, while the UE 105 may implement the exemplary embodiments of the adaptive antenna selection, the adaptive antenna selection functionality is not required to be used at all times and under all conditions.

Thus, in a first operation, the selection application 135 may determine whether the features of the exemplary embodiments should be used based on the current conditions being experienced by the UE 105. For example, the selection application 135 may determine if the UE 105 is substantially stationary, moving at a relatively slow rate of speed, or otherwise is experiencing conditions where the Bluetooth channel has characteristics that remain relatively unchanged (e.g., little or no shift in time or frequency). When the Bluetooth channel conditions remain relatively stable, it may be considered that the same results will occur for the antennas (e.g., if an antenna successfully transmitted a packet in the near past under these conditions, it is likely to successfully transmit the next packet or if the antenna was not successful in transmitting the packet, it is unlikely to successfully transmit the next packet). In some implementations, when the current conditions of the UE 105 indicate that characteristics of the Bluetooth channel are changing at a high rate, the selection application 135 may determine not to implement adaptive antenna selection. This is because even recent historical measurement information may not serve as a sufficient predictor for transmission of the next packet. Instead, a default or other standard selection mechanism may be used in selecting the Bluetooth antenna for transmitting a packet.

It is noted, however, that adaptive antenna selection may be performed when channel conditions are changing at a high rate, such as when the UE 105 is mobile or moving at a relatively fast speed. For instance, the adaptive antenna selection may perform better than, or as well as, conventional antenna selection techniques even when the rate of change in channel conditions decreases the predictive value of the historical information.

The selection application 135 may determine whether to implement adaptive antenna selection based on the current conditions of the connection (e.g., channel conditions). For example, the selection application 135 may determine that the current conditions are appropriate when a Bluetooth channel remains unchanged for a duration lasting a predetermined minimum amount of time or when the amount of change remains below a threshold for the predetermined minimum time. For example, the selection application 135 may not use the adaptive antenna selection when the channel conditions are changing more than a threshold amount (e.g., as indicated by one or more performance measures) within a predetermined minimum duration and may utilize the adaptive antenna selection features of the exemplary embodiments when the channel conditions are relatively stable for at least a predetermined period of time (e.g., based on a predetermined threshold). As will be described in further detail below, the historical measurement information may correspond to a predetermined minimum number of packet exchanges. The predetermined minimum number of packet exchanges may correspond to a duration of time that may form the basis upon which the current conditions are to be determined as being appropriate. For example, the predetermined minimum amount of time may be a factor (e.g., 5 times, 10 times, etc.) of the corresponding duration of time for the predetermined minimum number of packet exchanges.

The selection application 135 may continuously track the current conditions to determine if the current channel conditions have persisted for the predetermined amount of time such that the adaptive antenna selection may be used. In another manner, the selection application may begin tracking the current channel conditions when an event is registered. For example, the UE 105 may be equipped with further components such as an accelerometer or other sensors/components that measure movement. When the movement of the UE 105 is less than a predetermined threshold, the selection application 135 may then begin tracking the current channel conditions.

Figure 2:
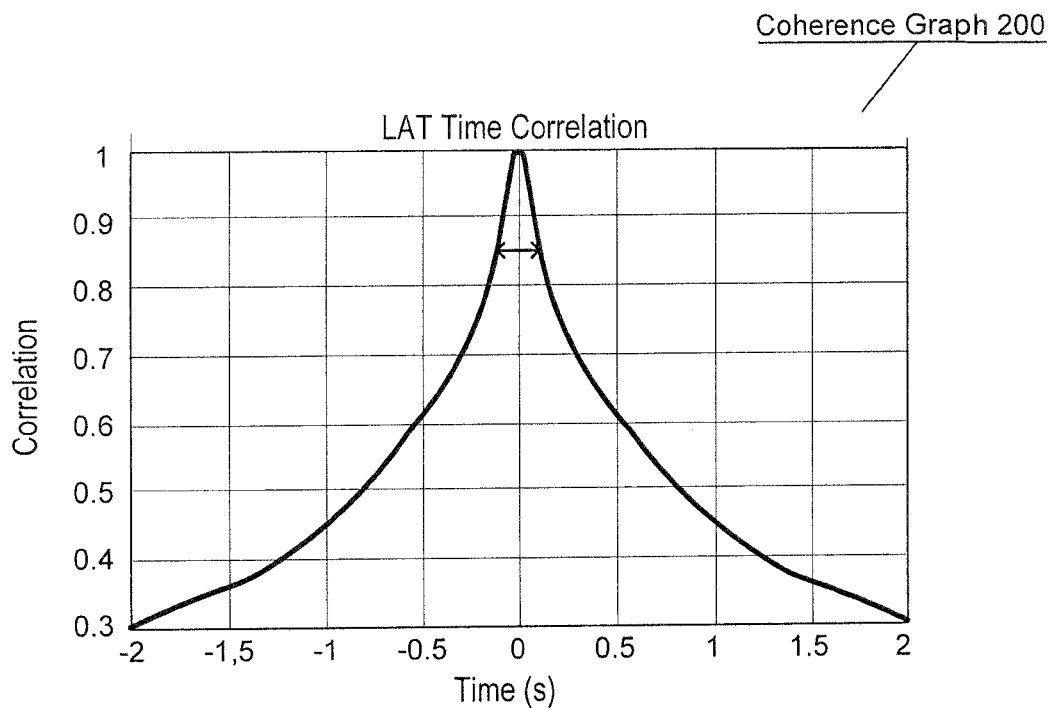
FIGS. 2-3 show example coherence graphs from using a wireless connection according to various exemplary embodiments described herein.
Figure 3:
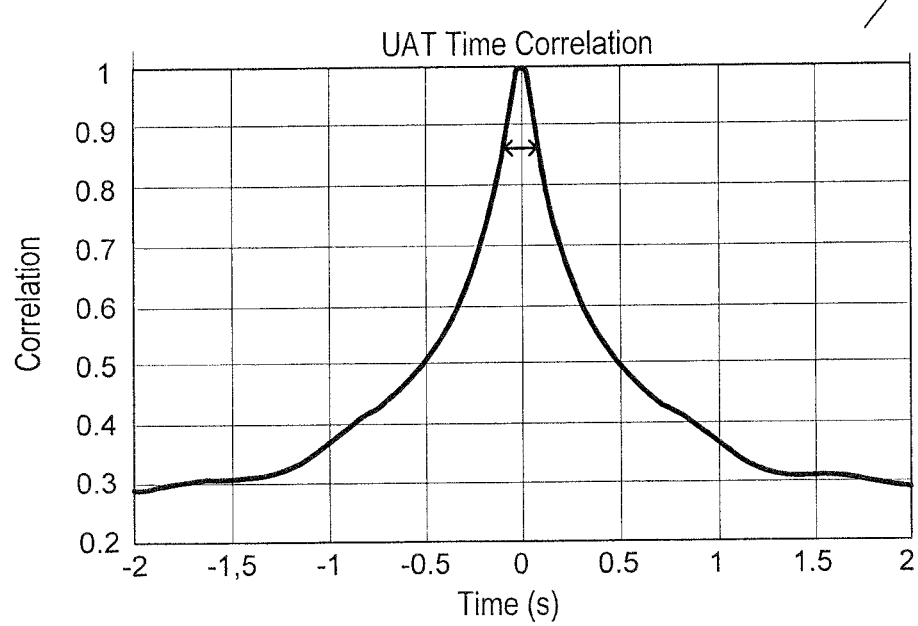

FIGS. 2-3 show coherence graphs 200, 300, respectively, corresponding to using a wireless connection according to various exemplary embodiments described herein. The coherence graph 200 of FIG. 2 relates to the lower Bluetooth antenna being used to transmit packets over the Bluetooth connection, while the coherence graph 300 of FIG. 3 relates to the upper Bluetooth antenna being used to transmit packets over the Bluetooth connection. The coherence graphs 200, 300 also relate to performing the packet transmissions (exchanges) while the UE 105 is substantially stationary, such that characteristics of the Bluetooth channel remain relatively unchanged.

The coherence graphs 200, 300 illustrate a relationship of time versus correlation to indicate a coherence time. As those skilled in the art will understand, the correlation may relate to how a particular connection parameter corresponds to an expected value. When the UE 105 is stationary, the correlation values over time may generate the curves illustrated in the coherence graphs 200, 300. As illustrated, the curves of the coherence graphs 200, 300 may have a measurable width as the time departs from a zero-time in either direction, the zero-time being an identity value. In contrast, those skilled in the art will understand that due to the changes that occur when the UE 105 is mobile, a width on curves of corresponding coherence graphs would be significantly smaller. That is, due to lower correlations as time increases/decreases from the zero-time, the curve may have a steeper incline approaching the zero-time from the negative and positive sides. As will become apparent below, the smaller width of coherence graphs due to mobile UEs may not provide a sufficient coherence time corresponding to a proper number of packet exchanges to provide the historical measurement information. Therefore, the exemplary embodiments provide the described functionalities when the UE 105 is substantially stationary. It should be noted that stationary may be a relative term and may be based on the UE 105 and the Bluetooth device 150. For example, the user of the UE 105 and the Bluetooth device 150 may be on a train that is traveling 60 mph, but the relative movement of the UE 105 and the Bluetooth device 150 is such that the devices appear stationary. Thus, stationary is not intended to connote (and is not limited to) not moving.

Using the coherence graphs 200, 300, a predetermined correlation level may be used as a basis for the predetermined minimum number of packet exchanges that is used by the adaptive selection mechanism. For example, to provide a satisfactory user experience while still benefiting from the advantages of using the adaptive selection mechanism, the correlation level may be set to 0.85 as shown by the arrows in FIGS. 2 and 3. It is noted that the correlation level of 0.85 is only exemplary and the exemplary embodiments may utilize any correlation level. At a 0.85 correlation level, there is an estimated coherence time of 0.15 seconds (e.g., the width of the coherence curve at the selected correlation level). The coherence time of 0.15 seconds may correspond to the time that twenty Bluetooth packet exchanges may be performed. The selection application 135 may set the predetermined minimum number of packet exchanges based on the number of packet exchanges that corresponds to the selected correlation level, which in this example would be twenty (20) packet exchanges. This predetermined minimum number of packet exchanges will provide the historical measurement information to be used for the adaptive selection mechanism.

It is noted that the selection application 135 may utilize any predetermined minimum number of packet exchanges that form the historical measurement information for the adaptive selection mechanism. That is, the use of twenty packet exchanges is only exemplary. Those skilled in the art will understand that twenty packet exchanges may provide a sufficient and relatively unchanging performance history. However, the exemplary embodiments may be configured to utilize a greater or lesser predetermined minimum number, e.g., as set by an administrator or dynamically selected by the selection application 135. Furthermore, the curves of the coherence graphs 200, 300 are also only exemplary and different tests and/or conditions may result in different curves such that a selected correlation level may result in a different coherence time and also a different predetermined minimum number of packet exchanges. Thus, based on a selected correlation level and available coherence graphs, the predetermined minimum number of packet exchanges may be modified accordingly.

Once the disposition of the UE 105 has been established where the characteristics of the Bluetooth channel remain unchanging or are changing at or below an acceptable threshold rate, the selection application 135 may be configured to determine whether a default selection mechanism is to be used or the adaptive selection mechanism (along with the tracking mechanism) is to be used. That is, the selection application 135 may perform another determination as to whether the adaptive features of the exemplary embodiments are to be utilized.

In a second operation, the selection application 135 may determine whether the features of the exemplary embodiments are still applicable to the current conditions of the UE 105. The selection application 135 may determine whether a performance level of the Bluetooth connection between the UE 105 and the Bluetooth device 150 is at, above, or below a predetermined performance threshold. As noted above, the conventional selection mechanisms may not perform at a desired level when the current conditions are not within an acceptable range. For example, if the current conditions indicate that the Bluetooth connection is at a worse performance level (e.g., less than the predetermined performance threshold), the conventional selection mechanism may not perform at an acceptable level and may have an increased packet drop rate that may adversely affect the user experience. However, if the current conditions indicate that the Bluetooth connection is at a desired performance level (e.g., more than the predetermined performance threshold), the conventional selection mechanism may be sufficient to provide an adequate user experience. In this manner, the selection application 135 may perform this second operation to determine when a default selection mechanism (which may be one of the conventional selection mechanisms) is to be used and when the adaptive antenna selection mechanism according to the exemplary embodiments is to be used. For illustrative purposes, the default selection mechanism may be the blind switch selection mechanism, but any conventional antenna selection mechanism can be used. The performance level of the Bluetooth connection may be determined using one or more of a variety of different measurements (e.g., RSSI, RSRP, RSRQ, etc.). In one example, the predetermined performance threshold may correspond to a sensitivity level at or above 15 dB. It is noted that the sensitivity level of 15 dB is only exemplary and any sensitivity level may be selected as the threshold. It is again noted that the upper antenna only or the lower antenna only selection mechanism may also be used. Although the selection application 135 performs the determinations of which mechanism to select, the measurement application 130 may be configured to measure the performance level of the Bluetooth connection, the corresponding output being provided to the selection application 135.

The manner in which the selection application 135 utilizes the measurements of the performance level may also indicate how subsequent operations are to be performed. As will be described in further detail below, the selection application 135 may determine when to utilize the adaptive selection mechanism and when to exit using the adaptive selection mechanism in various manners based on the measurements of the performance level. In a first example, the selection application 135 may include a setting in which the adaptive selection mechanism is used whenever the performance level falls below the predetermined performance threshold. In a second example, the selection application 135 may modify the first example such that the performance level must fall below the predetermined performance threshold for a predetermined time duration (e.g., for hysteresis). In a third example, the first and second examples may be used (conversely) to exit the adaptive selection mechanism when the performance level rises above the predetermined performance threshold. In a fourth example, the selection application 135 may utilize a counter that tracks when the historical performance information becomes available for use in the adaptive selection mechanism. Under the tracking mechanism, the counter may track a number of packet transmissions (or exchanges) that have been performed for use with the predetermined minimum number of packet transmissions (or exchanges). With the tracking mechanism being used, it may be assumed that the UE 105 is relatively stationary and the performance level has fallen under the predetermined performance threshold. If the selection application 135 receives an indication that the performance level has risen above the predetermined performance threshold, the selection application 135 may reset the counter. Thus, if the performance level falls below the predetermined performance threshold at a later time, the counter may begin anew to track packet exchanges for the current set of conditions.

It is noted that the determination of whether the current conditions include a Bluetooth connection being at a predetermined performance level is only exemplary. For example, according to another exemplary embodiment, the adaptive selection mechanism may be set to always be utilized, regardless of whether the performance level of the Bluetooth connection is above or below the predetermined performance threshold. However, those skilled in the art will understand that the default selection mechanism may require fewer operations while providing a comparable performance to the adaptive selection mechanism.

Once the disposition of the UE 105 has been established where the characteristics of the Bluetooth channel remain relatively stable and the performance level of the Bluetooth connection is above the predetermined performance threshold, the selection application 135 may be configured to terminate use of the adaptive antenna selection mechanism and to utilize a default selection mechanism. As noted above, the default selection mechanism may be the blind switch selection mechanism, in which an initial default Bluetooth antenna (e.g., the upper Bluetooth antenna) is selected.

Once the disposition of the UE 105 has been established where the characteristics of the Bluetooth channel remain unchanging and the performance level of the Bluetooth connection is below the predetermined performance threshold, the selection application 135 may be configured to utilize the tracking mechanism and the adaptive antenna selection mechanism, e.g., in accordance with the exemplary embodiments. When the selection application 135 determines that the mechanisms according to the exemplary embodiments are to be used, the selection application 135 may utilize the tracking mechanism to generate the historical measurement information and maintain the historical measurement information in a sliding window, such that the historical information considered remains relevant to the current packet exchange for which adaptive antenna selection is implemented. Thus, the tracking mechanism may be utilized throughout the time that the adaptive selection mechanism is used.

The tracking mechanism may be configured to track information corresponding to a given packet exchange. Initially, a packet exchange may relate to an attempt of a particular packet of data being transmitted from the UE 105 and being received by the Bluetooth device 150 over the Bluetooth connection with a subsequent result of the packet transmission attempt being transmitted from the Bluetooth device 150 to the UE 105 over the Bluetooth connection. When exchanging the packet, the Bluetooth protocol defines operations that are to be performed. For example, for a given packet, there may be an initial transmission attempt. If the packet is successfully exchanged using this initial transmission attempt, the receiving device (e.g., the Bluetooth device 150) may acknowledge receipt by returning an ACK to the transmitting device (e.g., the UE 105). However, if the packet was not successfully received, the receiving device may return a NACK to the transmitting device. Thereafter, the Bluetooth protocol may indicate that one or more retransmission attempts are to be made, where besides a final retransmission attempt, no further retransmission attempts are to be used if an ACK is returned. Thus, with each retransmission attempt, a successful attempt may entail returning an ACK and a failed attempt may entail returning a NACK. For illustrative purposes, the exemplary embodiments are described herein where a packet exchange involves up to three total attempts (e.g., an initial transmission attempt and two retransmission attempts).

Initially, it is noted that the count for the packet exchange used herein may relate to different aspects and the exemplary embodiments may be utilized for each different aspect. In a first example, the packet exchange may relate to a specific packet and all transmission attempts that are involved. Thus, with reference to the predetermined minimum number of packet exchanges, the predetermined minimum number being twenty which corresponds to a 0.85 correlation and a 0.15 second coherence time may be where the curve for the coherence graphs 200, 300 tracks unique packets. Therefore, this threshold may indicate that twenty unique packets were exchanged and/or attempted to be exchanged. In a second example, the predetermined minimum number may be where the curve for the coherence graphs 200, 300 tracks unique transmission attempts. That is, the packet exchange may relate to all transmission attempts that are used. Therefore, this threshold may indicate that twenty unique transmission attempts (e.g., both initial transmission attempts and retransmission attempts) were performed. For illustrative purposes, the predetermined minimum number of packet exchanges relates to unique packets and the one or more (re-)transmission attempts used for each respective packet.

For each packet exchange being performed, the tracking mechanism may be used to generate a plurality of different types of information. In a first type of information, the tracking mechanism may be used to identify the Bluetooth antenna being used and the frequency (or channel) over which each transmission attempt for the packet is performed. In a second type of information, the tracking mechanism may be used to measure a connection parameter such as RSSI for each transmission attempt of the packet. That is, at the time that the transmission attempt is performed, the RSSI value over the Bluetooth connection may be measured by the measurement application 130 and recorded. In a third type of information, the tracking mechanism may track a number associated therewith to indicate a timing relative to a current time (e.g., relative to a current packet exchange in which a determination of how to select the Bluetooth antenna is being performed). In a fourth type of information, the tracking mechanism may identify the result that occurred from each transmission attempt of the packet based on a response from the receiving device. Specifically, the ACK/NACK information may be associated with each of the transmission attempts. In this manner, the packet exchange may be stored in the historical measurement repository 140 where each transmission attempt of the packet is associated with any/all of the Bluetooth antenna that was used, the frequency value, the RSSI value, the number value, and the ACK/NACK information associated therewith. It is noted that the packet exchange may be stored with one or more further types of pertinent information that may be used by the selection application 135.

The tracking mechanism may include another component. Specifically, in a first aspect, the tracking mechanism may relate to generating the above noted information. However, in a second aspect, the tracking mechanism may relate to when the historical measurement information does not yet satisfy the predetermined minimum number of packet exchanges. As noted above, the selection application 135 may utilize a criteria where the historical measurement information is to include information corresponding to packet exchanges that number at least the predetermined minimum number of packet exchanges. In this manner, the selection application 135 may perform a more informed decision making process and avoid basing a determination on possible outlier information. Thus, the tracking mechanism may relate to the selection mechanism that is used while the historical measurement information is being accumulated. Thus, when the selection application 135 identifies that the historical measurement information is not yet sufficient, the selection application 135 may utilize this second aspect of the tracking mechanism.

The second aspect of the tracking mechanism may be any selection mechanism in which the historical measurement information may be gathered. For illustrative purposes, the selection mechanism used during the tracking mechanism may be the same default selection mechanism, e.g., a blind switch selection mechanism. In this manner, the historical measurement information may include data associated with both of the Bluetooth antennas (assuming that there was at least one switch that was performed). Thus, assuming that the predetermined minimum number of packet exchanges corresponds to twenty packet exchanges, the blind switch selection mechanism may be used by the tracking mechanism for at least twenty packet exchanges to generate the historical measurement information. It is again noted that the tracking mechanism may continue in view of a sliding window corresponding to a duration for the historical measurement information.

When the disposition of the UE 105 has been established where the characteristics of the Bluetooth channel remain relatively unchanging and the performance level of the Bluetooth connection is below the predetermined performance threshold, the selection application 135 may also utilize the adaptive selection mechanism according to the exemplary embodiments. The adaptive selection mechanism may be used when the tracking mechanism has gathered sufficient historical measurement information (e.g., for at least twenty prior packet exchanges).

The adaptive selection mechanism may be configured to utilize the historical measurement information to select one of the Bluetooth antennas to be used in a transmission attempt for a current packet exchange. That is, for each transmission attempt of the current packet exchange, the selection application 135 may reference the appropriate historical measurement information to select a desired Bluetooth antenna. For example, the twenty packet exchanges that immediately precede the current packet exchange may form the basis of the historical measurement information. As noted above, this manner of formulating the historical measurement information may be encompassed as a sliding window (e.g., of a duration corresponding to the number of desired packet exchanges). That is, the sliding window duration may be the immediately preceding predetermined minimum number of packet exchanges relative to a current packet exchange. For example, assuming the predetermined minimum number of packet exchanges is twenty, the tracking mechanism may be used to continuously generate information for packet exchanges from a first packet exchange to an immediately preceding packet exchange relative to the current packet exchange. Thus, if the current packet exchange is number 21, then the sliding window may be for the packet exchanges numbering 1 to 20 and the historical measurement information may correspond to these packet exchanges. If the current packet exchange is number 45, then the sliding window may be for the packet exchanges numbering to 25 to 44 and the historical measurement information may correspond to these packet exchanges. In this manner, relatively current data is used by the selection application 135 in performing the adaptive antenna selection mechanism while omitting older data with a potentially lower predictive value. It is noted that the sliding window may be sized to encompass any number of samples, any duration, or any combination thereof.

In selecting the Bluetooth antenna, the adaptive selection mechanism may utilize the historical measurement information and identify if the current channel (or frequency) for the current packet exchange or a neighboring channel (or frequency) has been used in any of the packet exchanges of the historical measurement information. The permissible degree of separation between the current channel and a neighboring channel can be configured as desired. When at least one packet exchange on the current channel or a sufficiently neighboring channel is identified in the historical measurement information, the adaptive selection mechanism may select the Bluetooth antenna having a better historical performance in receiving a packet on the identified channel (or frequency). For example, the historical measurement information may indicate that, for the current channel, the upper Bluetooth antenna has a higher RSSI than the lower Bluetooth antenna. Accordingly, the adaptive selection mechanism may select the upper Bluetooth antenna given this historical performance. Based on this selection, the selection application 135 may perform the initial transmission attempt for the current packet exchange.

It is noted that if the historical measurement information does not include data for the current channel or a nearby channel associated with the current packet exchange, the selection application 135 may be configured to utilize a different selection mechanism. For example, if the adaptive selection mechanism is not capable of making an informed determination because the historical measurement information has no directly corresponding data, the adaptive selection mechanism may still select the Bluetooth antenna using other criteria. In a first example, the adaptive selection mechanism may simply select a default Bluetooth antenna. In this manner, the tracking mechanism may be used and historical measurement information for the current channel may be generated for use in subsequent packet exchanges. In a second example, the adaptive selection mechanism may determine which of the Bluetooth antennas has had historically better performance and select the better performing Bluetooth antenna. If substantially similar performance is determined to have occurred across the antennas, either Bluetooth antenna may be selected. The adaptive selection mechanism may base the historical performance upon any time duration. For example, the time duration may be for the sliding window, for the entire set of data in the historical measurement repository 140, etc.

Based on whether the UE 105 successfully transmits the packet to the Bluetooth device 150 during the initial packet exchange attempt, the adaptive selection mechanism may perform different operations for each retransmission attempt. To generate more comprehensive historical measurement information, the adaptive selection mechanism may allow the tracking mechanism to continue to be used. As noted above, the tracking mechanism may continuously be used while the Bluetooth connection is established. For example, for each retransmission attempt that is based on a packet not being received, the adaptive selection mechanism may again use the historical measurement information to select the desired Bluetooth antenna. For example, upon receipt of a NACK from the Bluetooth device 150, the UE 105 may proceed in this manner. The tracking mechanism may be used to select a Bluetooth antenna based on the channel and the RSSI value. The other aforementioned information may also be associated, such as a number value. The historical measurement repository 140 may then be further populated with this information for the current packet exchange, e.g., the retransmission attempt. It is noted that for each retransmission attempt, the current channel being used for the attempt of the current packet exchange may also be changed.

For each available retransmission attempt, even if the packet was successfully received, the adaptive selection mechanism may nonetheless trigger a NACK response and corresponding NACK operations. For example, upon receipt of an ACK from the Bluetooth device 150, the UE 105 may proceed in this manner. As noted above, although conventional operations indicate that no further attempts are to be used when an ACK is returned upon successful reception of the packet, the adaptive antenna selection mechanism may be configured to trigger the NACK response such that the retransmission attempts may be utilized to gather further historical measurement information. Thereafter, substantially similar operations as if the packet failed to be received may be performed. However, it is noted that, with the current frequency being changed, the Bluetooth antenna that was not used in the immediately previous attempt may be selected. That is, the adaptive antenna selection mechanism may switch to the other Bluetooth antenna. In this manner, historical measurement information for both Bluetooth antennas may be collected. This process, whether the packet is received or not, may continue until the retransmission attempts have been exhausted. Subsequently, when a next packet exchange is being processed, this current packet exchange may form a portion of the historical measurement information for the next packet exchange.

Accordingly, when a number of transmission opportunities, e.g., slots, are allocated for a packet exchange, a retransmission can be triggered even if the packet was successfully received by either of both of the devices. The retransmissions provide a greater number of data points by which to gauge which of the available antennas may provide a greater likelihood of success for a transmission, particularly when channel conditions are marginal.

It is again noted that there may be constant or intermittent monitoring as to which selection mechanism is to be used. For example, if the UE 105 has become mobile, the selection application 135 may use a corresponding selection mechanism for when the stationary nature of the UE 105 is no longer present. It is noted that the mobile selection mechanism may also be the same default selection mechanism. However, the selection application 135 may also utilize a different selection mechanism (e.g., one that compensates for the mobility of the UE 105). If the UE 105 has become stationary, the selection application 135 may determine how to proceed with selecting between the default selection mechanism and the adaptive selection mechanism. In another example, when the performance level of the Bluetooth connection falls below or rises above the predetermined performance threshold, the selection application 135 may respond by switching between the default and adaptive selection mechanisms, as is described in further detail below. This monitoring may continue so that the selection application 135 may dynamically use the proper selection mechanism for the conditions in which the UE 105 is operating.

It is also noted that there may be one or more additional criteria that may be considered in determining which of the selection mechanisms is to be used. For example, the selection application 135 may determine that the adaptive selection application is (or is not) to be used based on a type of traffic being exchanged over the Bluetooth connection. In another example, the selection application 135 may determine that the adaptive selection application (adaptive antenna selection) is to be used for a duration of time that is independent of all other considerations. In a further example, the selection application 135 may determine that the adaptive selection application is to be used only while a power supply level is above a predetermined power threshold. As the adaptive selection application may utilize additional operations, and since the impact on user experience is intended to be reduced as much as possible, the selection application 135 may utilize the adaptive selection application while concerns regarding an available power supply is low.

The exemplary embodiments describe determining which of a plurality of different antenna selection mechanisms is to be used for a packet exchange over a wireless connection, e.g., a Bluetooth connection. A default selection mechanism can be implemented when the current conditions do not indicate or suggest use of the adaptive antenna selection mechanism (e.g., UE 105 is mobile or the Bluetooth connection is changing at an unacceptable rate). The selection application 135 may utilize a tracking mechanism to determine antenna history information. In some implementations, the tracking mechanism can be used with the default selection mechanism to populate historical measurement information until a predetermined minimum amount of information is gathered. In other implementations, the tracking mechanism can be used with one or more default selection mechanisms, the adaptive antenna selection mechanism, or a combination thereof. Thereafter, for any ensuing packet exchange, the selection application 135 may select the appropriate antenna, e.g., for transmitting a packet, using some or all of the historical measurement information.

Figure 4:
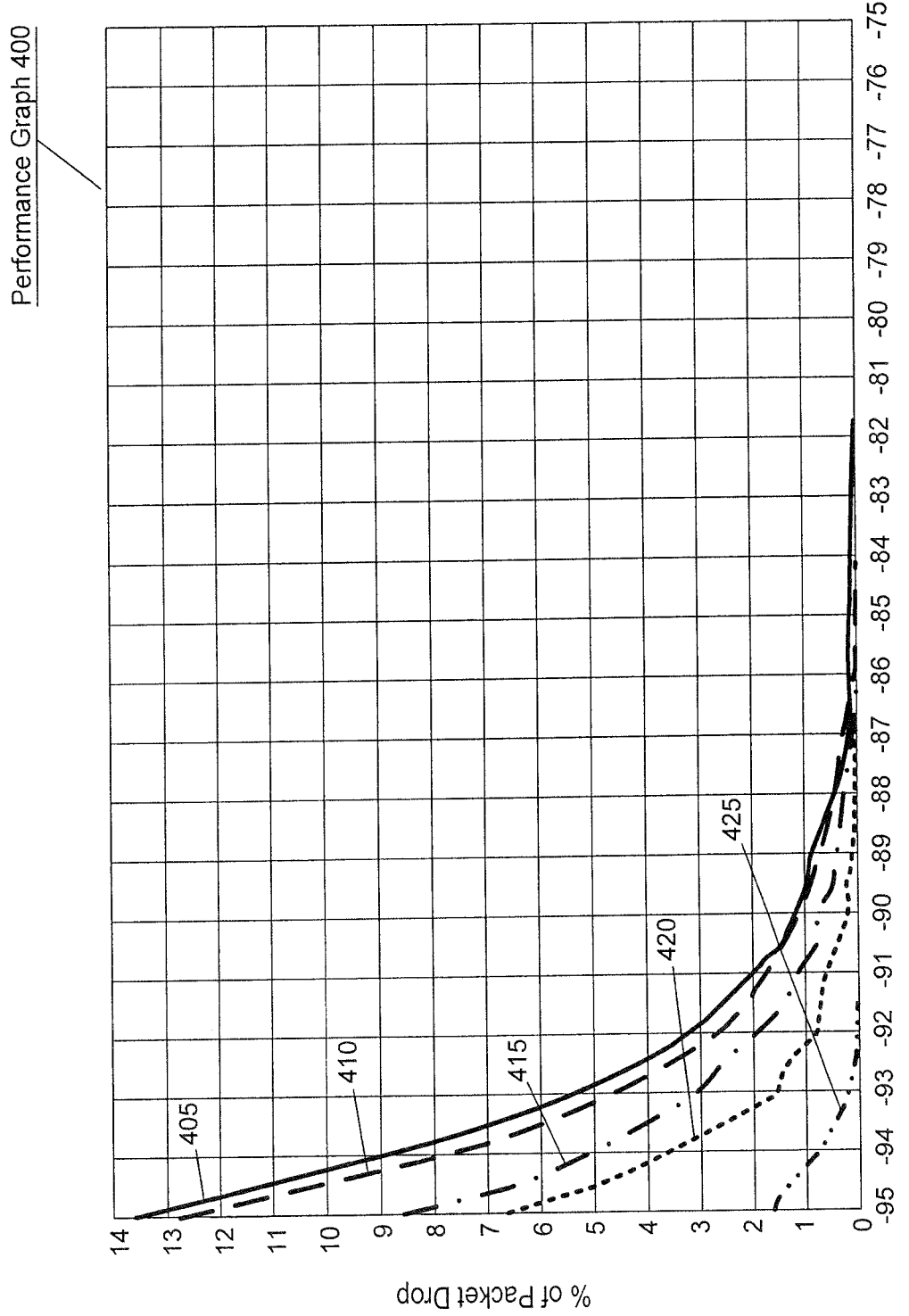
FIG. 4 shows an example performance graph from using a plurality of selection mechanisms according to various exemplary embodiments described herein.

FIG. 4 shows a performance graph 400 generated by using a plurality of selection mechanisms, according to various exemplary embodiments described herein. The performance graph 400 corresponds to when the current conditions indicate that the adaptive selection mechanism is to be used. That is, the UE 105 may be stationary, or experiencing substantially consistent channel conditions, and the Bluetooth connection may have a performance level that is below a predetermined performance threshold. The performance graph 400 shows how each of the selection mechanisms perform while these current conditions are present. As shown, the performance graph 400 includes a first curve 405 corresponding to the upper Bluetooth antenna selection mechanism (where only the upper Bluetooth antenna is selected), a second curve 410 corresponding to the lower Bluetooth antenna selection mechanism (where only the lower Bluetooth antenna is selected), a third curve 415 corresponding to the blind switch selection mechanism, a fourth curve 420 corresponding to the adaptive selection mechanism according to the exemplary embodiments, and a fifth curve 425 corresponding to a upper bound selection mechanism. The upper bound selection mechanism may relate to when two or more receivers are configured to receive a single packet.

As illustrated, the performance of the upper Bluetooth antenna selection mechanism as shown with the curve 405 has a highest percentage of packet drops as the root mean square (RMS) level falls under −85 dB. The RMS level may correspond to the average RSSI value of the Bluetooth connection. The lower Bluetooth antenna selection mechanism as shown with the curve 410 provides some improvement over the upper Bluetooth antenna selection mechanism. Further still, the blind switch selection mechanism illustrated by the curve 415 offers a more noticeable improvement over the lower Bluetooth antenna selection mechanism. However, as shown in the curve 420, the adaptive antenna selection mechanism has a significantly improved performance over the upper Bluetooth antenna selection mechanism, the lower Bluetooth antenna selection mechanism, and the blind switch antenna selection mechanism. Thus, those skilled in the art will appreciate how the adaptive selection mechanism according to the exemplary embodiments provide an overall improved performance in selecting antennas to be used for wireless communications over a connection, particularly while the current conditions indicate that the UE 105 is substantially stationary (or the connection remains relatively consistent) and the quality of the Bluetooth connection is below the predetermined performance threshold.

As noted above, the upper bound selection mechanism relates to when two or more receivers are configured to receive a single packet. As shown in the performance graph 400, the curve 425 for the upper bound selection mechanism may provide an even further improved performance. However, those skilled in the art will understand that the upper bound selection mechanism may have performance information in testing environments only. That is, available UEs 105 and/or Bluetooth devices 150 may not yet be equipped with the upper bound selection mechanism. However, it is noted that even if an available UE 105 is to be equipped with the upper bound selection mechanism, those skilled in the art will understand that the features of the exemplary embodiments may be modified to incorporate the upper bound selection mechanism to potentially further improve an overall performance for adaptive antenna selection.

Figure 5:
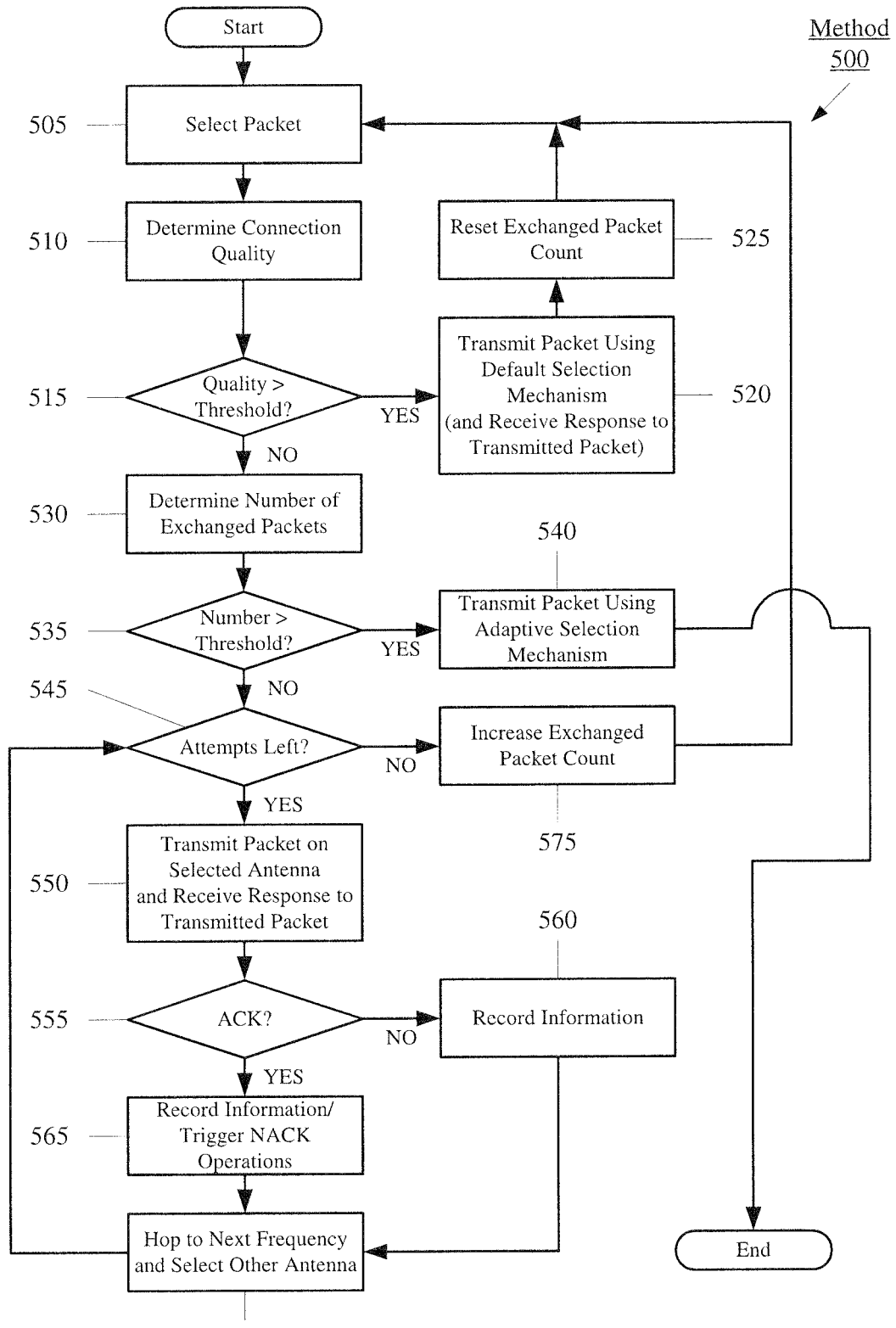
FIG. 5 shows an example method for using a tracking mechanism according to various exemplary embodiments described herein.

FIG. 5 shows a method 500 for using a tracking mechanism according to various exemplary embodiments described herein. The method 500 may relate to the second aspect of the tracking mechanism in which a minimum (or small) amount of data for the historical measurement information is gathered for use by the adaptive selection mechanism. Therefore, the method 500 may relate to how the UE 105 populates the historical measurement repository 140 with information associated with previous packet exchanges, occurring prior to a current packet exchange. The method 500 is performed by the UE 105 and the method 500 will be described with regard to the system 100 of FIG. 1.

Initially, it is noted that the method 500 may assume that the UE 105 is in a stationary disposition or having current conditions under which the characteristics of the Bluetooth connection remain relatively unchanging (substantially stable or consistent). Accordingly, this criteria for performing the remaining operations may already be satisfied. However, it is noted that the method 500 may incorporate an initial operation in which this determination is made. As described above, the UE 105 may measure movement information (e.g., using sensors such as accelerometers, gyroscopes, GPS readings, WiFi location sensing, etc.) or measure changes to characteristics of the Bluetooth connection in making this determination. If current conditions (link, channel, etc.) associated with the UE 105 show or indicate that the characteristics of the Bluetooth connection are changing at a rate in excess of a threshold (e.g., too quickly for even short-term continuity), the UE 105 may select a corresponding antenna selection mechanism (e.g., a default selection mechanism of a blind switch).

In 505, the UE 105 selects a packet to be transmitted to the Bluetooth device 150. For example, an application that may stream data to the Bluetooth device 150 from the UE 105 may provide an indication of a packet of data that is to be transmitted over the Bluetooth connection. The UE 105 may select the packet and perform any preparations (e.g., formatting) for the packet to be transmitted via the transceiver 120 and the antenna arrangement 125.

In 510, the UE 105 determines a quality of the connection, e.g., the Bluetooth connection. Although another determination as to the changing or static nature may incorporate measurements associated with the quality of the Bluetooth connection, the UE 105 may make this determination relative to a predetermined performance threshold. That is, the quality of the connection is measured as a performance level such as based on RSSI. Accordingly, in 515, the UE 105 determines whether the quality (or performance level) is greater than (or equal to) the predetermined performance threshold. If the Bluetooth connection has a quality that is greater than the predetermined performance threshold, in 520, the UE 105 transmits the selected packet using the default selection mechanism (e.g., blind switch). As noted above, the default selection mechanism may provide a substantially similar performance as the adaptive antenna selection when the quality of the connection is at least the predetermined performance threshold. Accordingly, under these circumstances, the default selection mechanism may be used to, for example, conserve battery power relative to using the adaptive antenna selection. The UE 105 may also attempt to receive a response to the transmitted packet (e.g., an ACK, a NACK, or no response).

In 525, the UE 105 resets an exchanged packet count. As noted above, in some embodiments, the number of exchanged packets may be used as a basis in determining whether the adaptive selection mechanism is to be used. For example, using the coherence graphs 200, 300, a correlation level may be selected that identifies a coherence time and a corresponding number of packet exchanges that may be performed therein. In a specific example, with a 0.85 correlation level, a coherence time may be 0.15 seconds, which corresponds to approximately 20 Bluetooth packet exchanges. However, when the current conditions of the UE 105 indicate that the Bluetooth connection has a quality that is greater than the predetermined performance threshold, the adaptive selection mechanism may not be used. Thus, any packet exchange counter may be reset in view of the quality satisfying the threshold. Thereafter, the UE 105 may select another outgoing packet in 505.

If the quality of the Bluetooth connection is not greater than the predetermined performance threshold, the UE 105 may continue from 515 to 530. Specifically, the Bluetooth connection being less than the predetermined performance threshold may indicate that the adaptive selection mechanism and the tracking mechanism are to be used. In 530, the UE 105 determines a number of packet exchanges that have been tracked at the time the indication has been received. Specifically, the UE 105 may determine whether the historical measurement information is sufficiently large and incorporates information of at least a predetermined minimum number of packet exchanges (e.g., corresponding to the coherence time of the selected correlation level) that are to be used by the adaptive selection mechanism. Thus, in 535, the UE 105 determines whether the number of packet exchanges is greater than the predetermined minimum number of packet exchanges. If the number of packet exchanges is greater than this threshold, in 540, the UE 105 transmit the packet using the adaptive selection mechanism. The corresponding method in using the adaptive selection mechanism is described in detail below with regard to FIG. 6.

If the number of packet exchanges is not greater than the predetermined minimum number of packet exchanges, the UE 105 continues from 535 to 545. The UE 105 determines that the tracking mechanism is to be used where the historical measurement information is to be populated by including the information associated with performing the packet exchange of the selected packet in 505. The second aspect of the tracking mechanism in which historical measurement information is to be gathered may be used. In 545, the UE 105 determines whether there are remaining transmission attempts to be made for this incoming packet. As this iteration of the method 500 relates to an initial transmission attempt and a corresponding response receiving attempt, the UE 105 may continue to 550.

In 550, the UE 105 transmits the packet on a selected antenna based on a corresponding selection mechanism associated with the second aspect of the tracking mechanism. As described above, the second aspect of the tracking mechanism may utilize a default selection mechanism such as the blind switch selection mechanism. The blind switch selection mechanism may include utilizing a default antenna and switching to the other antenna whenever a packet drop or a failure event occurs (e.g., the packet is not successfully received). Thus, if this iteration relates to a first time that the blind switch selection mechanism is to be used, a default antenna may be selected. Otherwise, a previously used Bluetooth antenna may be selected. Thus, the selected antenna may be used to attempt to receive a response to the transmitted packet.

In 555, the UE 105 determines whether an ACK was received from the Bluetooth device 150 in response to the transmitted packet. As noted above, the packet exchange may also include a response as to whether the packet was successfully received by the Bluetooth device 150 in the form of an ACK, a NACK, or a constructive NACK when no form of a response is received within a predetermined window of time. It is noted that the Bluetooth device 150 may perform a determination as to whether the packet was successfully received in a variety of manners. For example, after receiving data associated with the packet, a validation operation may be used, such as a checksum or a cyclic redundancy check (CRC). If the validation operation passes, the packet may be determined to be successfully received. Accordingly, the Bluetooth device 150 may transmit an ACK back to the UE 105. If the ACK is not received by the UE 105, the UE 105 may conclude a constructive NACK. If the validation operation fails, the packet may be determined to not have been received. Accordingly, the Bluetooth device 150 may transmit a NACK back to the UE 105. If the NACK is not received by the UE 105, the UE 105 may conclude a constructive NACK.

If a NACK was received from the Bluetooth device 150 or no response was received from the Bluetooth device 150 and a constructive NACK is assumed, the UE 105 continues from 555 to 560. In 560, the UE 105 records the information associated with this packet exchange. As noted above, the information may include any/all of the selected antenna, the frequency (or channel) over which the packet exchange is performed, a packet exchange count, an RSSI value measured at the time of exchange, and the corresponding result of a NACK or constructive NACK. Since the packet was not received, the UE 105 may continue with the blind switch selection mechanism in view of the NACK being received.

If the packet was successfully received and an ACK was received from the Bluetooth device 150, the UE 105 continues from 555 to 565. In 565, the UE 105 records the information associated with this transmission attempt. In contrast to the information gathered in 560, the corresponding result may be an ACK. Even though the packet was successfully transmitted, for the historical measurement information to be generated more comprehensively, the UE 105 may trigger NACK operations to be performed. That is, despite an ACK being received from the Bluetooth device 150, the UE 105 may continue with the blind switch selection mechanism as if a NACK was received.

After 560 or 565, in 570, the UE 105 hops to another frequency and selects a different available Bluetooth antenna. Specifically, the UE 105 may prepare to perform a retransmission attempt or a subsequent packet exchange under the blind switch selection mechanism (e.g., switching antennas when a packet exchange fails). The UE 105 may hop and select another antenna in light of the NACK being received or NACK operations being performed (when the ACK is received). The UE 105 may then return to 545. Again, in 545, the UE 105 may now determine whether there are transmission attempts that are available to be used. As noted above, the transmit procedure and/or type of traffic may permit a certain number, e.g., three, of transmission attempts, including an initial transmission attempt and one or more retransmission attempts. At this iteration of the method 500, a first retransmission attempt may be used. In this manner, the UE 105 may continue this cycle of operations until the transmission attempts have been exhausted for the selected packet in 505.

Once all the transmission attempts have been used and responses to the transmission attempts are identified, the UE 105 may have tracked all the information associated with each attempt and populated the historical measurement repository 140 with this packet exchange. Subsequently, the UE 105 continues from 545 to 575. In 575, the UE 105 increases the packet exchange count. For example, if this is a first pass in populating the historical measurement information, the packet exchange count may be increased from 0 to 1. In another example, if this is a twelfth pass in populating the historical measurement information, the packet exchange count may be increased from 11 to 12. It is again noted that this manner of increasing the packet exchange count is only exemplary (e.g., based on a unique packet). As noted above, if all the transmission attempts are exhausted and each transmission attempt is tracked by the packet exchange count, a first pass may increase the packet exchange count from, e.g., 0 to 3 or in increments of 3 (when the total number of packet exchange attempts is the initial transmission attempt and two retransmission attempts). The UE 105 returns the method 500 to 505. The UE 105 may continue to utilize the method 500 until the number of packet exchanges is at least the predetermined minimum number of packet exchanges as determined in 535 for the adaptive selection mechanism to be used while the quality of the connection is below the predetermined performance threshold.

Figure 6:
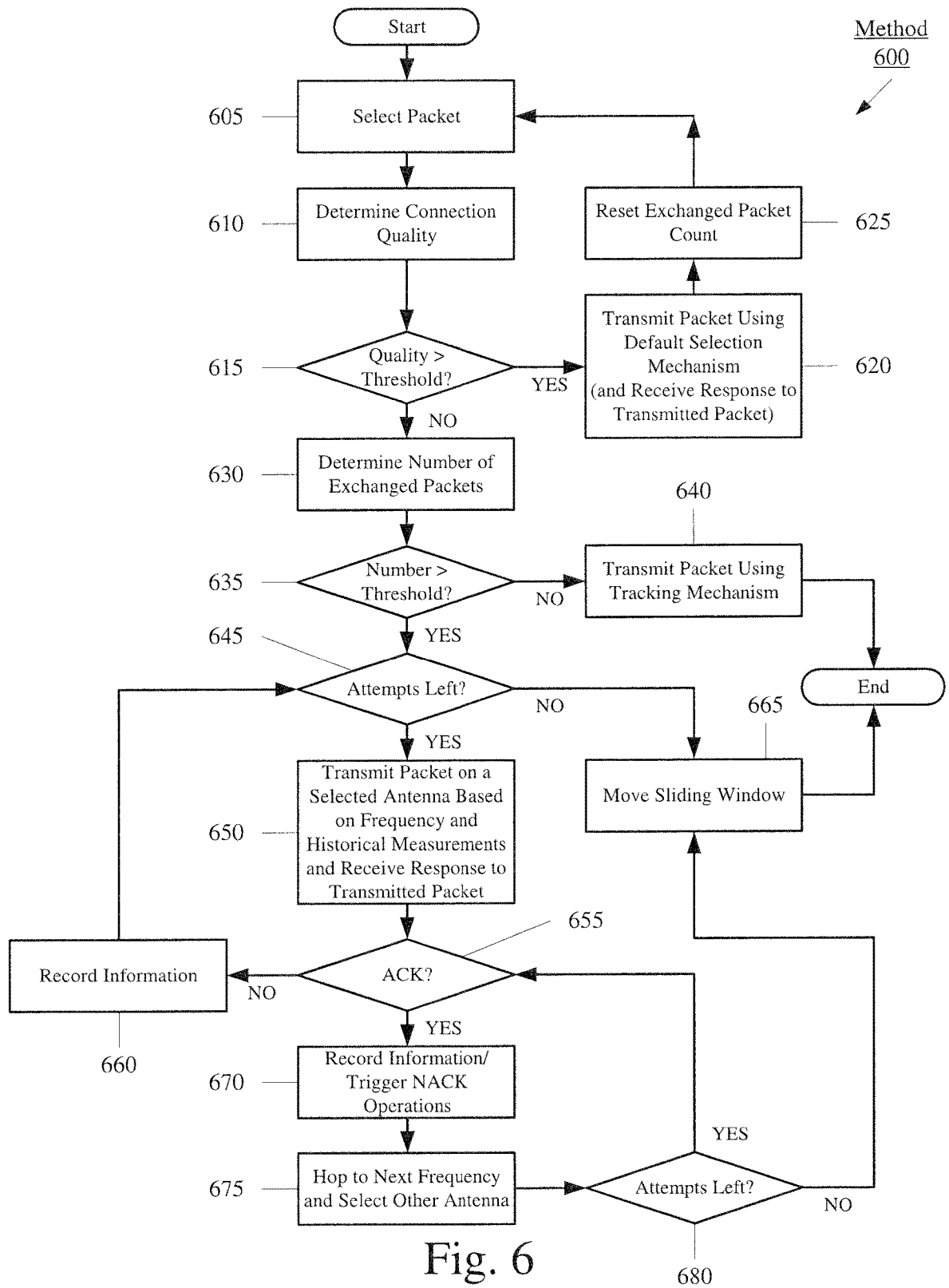
FIG. 6 shows an example method for using an adaptive selection mechanism according to various exemplary embodiments described herein.

FIG. 6 shows a method 600 for using an adaptive selection mechanism to select an antenna according to various exemplary embodiments described herein. Specifically, the method 600 may relate to when the second aspect of the tracking mechanism has accumulated the minimum amount of historical measurement information. Therefore, the method 600 may relate to how the UE 105 utilizes the historical measurement information, in the historical measurement repository 140, to select the antenna to be used for a current packet exchange. The antenna selection is intended to improve the likelihood of a successful transmission, based on the predictive value of the historical information. The method 600 is performed by the UE 105 and is described (for sake of example) with regard to the system 100 of FIG. 1.

In some embodiments, the method 600 may also assume that the UE 105 is in a relatively stable RF environment, e.g., current conditions are such that the characteristics of the connection remain relatively unchanged between communications (e.g., the devices are not experiencing a high rate of movement).

It is also noted that 605-635 may be substantially similar to 505-535, respectively, of the method 500 of FIG. 5. However, in contrast to 535, in 635, when the number of packet exchanges is less than the predetermined minimum number of packet exchanges, in 640, the UE 105 uses the second aspect of the tracking mechanism to further populate the historical measurement information. That is, 640 may correspond to the operations used to perform the transmission attempts for the packet in the method 500. However, if the number of packet exchanges is greater than the predetermined minimum number of packet exchanges, the UE 105 continues from 635 to 645. Thus, the following description may relate to detailed operations of 540.

In 645, the UE 105 determines whether there are any transmission attempts remaining for the packet exchange. As this is a first iteration, it is determined that at least one transmission attempt remains. In 650, under the adaptive selection mechanism, the UE 105 transmits the packet on a selected antenna based on the historical measurement information. For example, based on the frequency (or channel) at which the packet exchange is to be performed, the historical measurement information may indicate which of the antennas has had better historical performance. For example, the historical performance may be the RSSI value at the indicated frequency (or channel) for each available antenna. In other implementations, one or more additional or alternative performance values can be used. Thus, the antenna having the higher, e.g., RSSI value, may have a better likelihood of success (e.g., better performance) at the indicated frequency. The UE 105 may select this antenna to transmit the packet. Thereafter, the UE 106 may attempt to receive a response for this the initial transmission attempt for the transmitted packet.

In 655, the UE 105 determines whether an ACK was received in response to the packet being transmitted to the Bluetooth device 150. As noted above, the UE 105 may receive an ACK or a NACK, or assume a constructive NACK from the Bluetooth device 150 to indicate whether the packet was successfully received in a predetermined window of time. If the packet was not successfully received, the UE 105 continues to 660. In 660, the UE 105 records the information associated with this transmission attempt. Again, this information may include the selected antenna, the frequency that was used, a measured RSSI (or additional/alternative performance measure) at the time of exchange, etc. Thereafter, the UE 105 returns to 645. In 645, the UE 105 determines whether there are transmission attempts remaining. It is noted that with a retransmission attempt, the frequency with which an ensuing transmission attempt is performed may have been changed. At this iteration, the UE 105 may determine that there may be one or more (e.g., up to two) retransmission attempts remaining. In this subsequent pass of the method 600, in 650, the UE 105 may perform the retransmission attempt by selecting the antenna based on the historical measurement information. For example, if the frequency (or channel) changed, the historical measurement information associated with this changed frequency may be used. Accordingly, when the response is a NACK or a response is not received from the Bluetooth device 150 (e.g., no ACK is received), the UE 105 may perform further attempts to receive a response to corresponding further transmissions of the packet using an antenna selected based on the historical measurement information.

Returning to 655, if the UE 105 determines that the packet was successfully transmitted and an ACK was received from the Bluetooth device 150, the UE 105 continues to 670. As noted above, the adaptive selection mechanism may still utilize any remaining transmission attempts to generate more comprehensive historical measurement information associated with this packet exchange. Thus, in 670, the UE 105 records the information and triggers NACK operations despite the packet having been successfully received. In 675, the UE 105 changes to another frequency (or channel) and selects a non-selected Bluetooth antenna to receive a response to further transmission attempts. Again, any selection mechanism may be used in performing the transmission and retransmission attempts of the packet. In 680, the UE 105 determines whether any transmission attempts remain. In this manner, the comprehensive historical measurement information for this packet exchange and all transmission attempts may be gathered to populate the historical measurement repository 140.

When no further transmission attempts remain (e.g., after 645 or 680), the UE 105 continues to 665. In 665, the UE 105 moves the sliding window. That is, in preparation for further packets that are to be transmitted, the UE 105 may shift the historical measurement information that is to be used for these further packets in selecting the desired Bluetooth antenna to attempt to transmit a packet. Assuming no changes to the current conditions and since the number of packet exchanges exceeds the predetermined minimum number of packet exchanges, the UE 105 may move the sliding window so obsolete historical measurement information (measurement information captured more than a predetermined duration before the current packet exchange) is omitted from further consideration. For example, the sliding window may incorporate an immediately prior number of packet exchanges. The immediately prior number of packet exchanges may correspond to the predetermined minimum number of packet exchanges. In this manner, the historical measurement information has an increased relevance to the packet exchange being processed. However, it is again noted that moving the sliding window is only exemplary and other manners of using the historical measurement information may be used. For example, a weighting factor can be applied, weighting recently captured information more heavily, so the predictive value of more recently captured measurements is higher than older measurements.

It is noted that the method 600 may include further operations. For example, in 650, the Bluetooth antenna may not be capable of being selected based on the available historical measurement information. Specifically, the available historical measurement information may not have data corresponding to the frequency being used. Thus, the method 600 may include one or more further operations to compensate for this scenario. In a first example, the method 600 may include a determination whether the historical measurement information has a frequency (or channel) that is within a predetermined distance from the indicated frequency. If such data is present in the historical measurement information, the UE 105 may utilize this "near" frequency as a substitute for the indicate frequency. In a second example, the method 600 may utilize an overall performance history for each Bluetooth antenna to determine which of the Bluetooth antenna to select. In a third example, the method 600 may utilize a default selection when no sufficiently predictive data is available.

It is also noted that the methods 500, 600 may incorporate further operations in determining how the selection mechanisms are used. As noted above, there may be various other criteria that may be used in determining how the selection mechanisms are to be used. For example, an initial operation may include determining the type of traffic included in the packet exchange. Accordingly, the adaptive selection mechanism may be selected for certain types of traffic, but not used for other types of traffic. In another example, an initial operation may include determining an available power supply. Accordingly, the adaptive selection mechanism may be used only when the available power supply satisfies a power threshold.

The exemplary embodiments provide a device, system, and method of selecting an antenna among a plurality of available antennas that may each establish a wireless connection. When current conditions of a UE indicate that the adaptive selection mechanism according to the exemplary embodiments is to be used, the UE may select one of the antennas using historical measurement information so that a historically better performing antenna may be selected to exchange a packet over the wireless connection. So that this determination may be performed with improved results, the UE may populate the historical measurement information with a minimum amount of data that represents a more thorough analysis of historical performance of the available antennas.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:
1. A method, comprising:
at a user equipment (UE) including at least two antennas configured to allow the UE to communicate via a first connection:

selecting a connection performance parameter associated with the first connection;

generating historical measurement information for the at least two antennas based on the connection performance parameter, the historical measurement information indicating an expected performance associated with using a selected one of the at least two antennas for a packet transmission;

determining, from the historical measurement information, whether at least one characteristic of the first connection has remained substantially unchanged for a predetermined duration; and selecting, based at least on the historical measurement information and the determining whether the at least one characteristic of the first connection has remained substantially unchanged, one of the at least two antennas for use in transmitting the packet.

2. The method of claim 1, further comprising:
determining that a performance level associated with the first connection is below a predetermined performance threshold.

3. The method of claim 2, wherein the performance level is based at least on a received signal strength indicator (RSSI).

4. The method of claim 1, further comprising:
determining whether the historical measurement information includes a predetermined minimum number of packet transmissions.

5. The method of claim 4, wherein, when the historical measurement information is less than the predetermined minimum number of packet transmissions, selecting a default antenna of the at least two antennas.

6. The method of claim 5, wherein the default antenna is selected using a blind switch selection technique.

7. The method of claim 4, wherein the historical measurement information considered is based on a sliding window relative to a time at which the packet is to be transmitted.

8. The method of claim 7, wherein the sliding window includes a previous packet transmission immediately preceding the packet transmission.

9. The method of claim 1, wherein the packet transmission is capable of being perfomed with an initial transmission opportunity and at least one re-transmission opportunity, the method further comprising:
when one of an acknowledgement is received for the packet transmission over the first connection or when the packet transmission fails based on one of a negative acknowledgement being received or a time out, and when there is at least one re-transmission opportunity available: generating historical measurement information based on the packet transmission using the at least one of the two antennas; and
selecting a further one of the at least two antennas for a further packet transmission using the at least one re-transmission opportunity.

10. The method of claim 1, further comprising:
identifying at least one transmission parameter comprising an identification of a frequency with which the packet transmission is performed, a result of the packet transmission, and timing related information,
wherein the historical measurement information is generated to include the at least one transmission parameter.

11. The method of claim 1, wherein the first connection is a Bluetooth connection.

12. A user equipment, comprising:
a transceiver configured to establish a first connection;
an antenna arrangement comprising at least two antennas, each of the at least two antennas configured to allow the user equipment to communicate via the first connection; and
a processor configured to select a connection performance parameter associated with the first connection, the processor further configured to generate historical measurement information for the at least two antennas based on the connection performance parameter, the historical measurement information indicating an expected performance associated with using a selected one of the at least two antennas for a packet transmission, the processor further configured to determine, from the historical measurement information, whether at least one characteristic of the first connection has remained substantially unchanged for a predetermined duration, the processor further configured to select, based at least on the historical measurement information and the determination of whether the at least one characteristic of the first connection has remained substantially unchanged, one of the at least two antennas for use in transmitting the packet.

13. The user equipment of claim 12, wherein the first connection is a Bluetooth connection.

14. The user equipment of claim 12, wherein the at least two antennas include an upper Bluetooth antenna and a lower Bluetooth antenna.

15. The user equipment of claim 12, wherein the processor is configured to determine whether the historical measurement information includes a predetermined minimum number of packet transmissions and when the historical measurement information includes less than the predetermined minimum number of packet transmissions, the processor is configured to select a default antenna of the at least two antennas.

16. The user equipment of claim 12, wherein the packet transmission is capable of being performed with an initial transmission opportunity and at least one re-transmission opportunity, and the processor determines that one of an acknowledgement is received for the packet transmission over the first connection or the packet transmission fails based on one of a negative acknowledgement being received or a time out, and there is at least one re-transmission opportunity available, the processor is further configured to generate historical measurement information based on the packet transmission using the at least one of the two antennas and select a further one of the at least two antennas for a further packet transmission using the at least one re-transmission opportunity.

17. The user equipment of claim 12, wherein the historical measurement information considered is based on a sliding window relative to a time at which the packet is to be transmitted, wherein the sliding window includes a previous packet transmission immediately preceding the packet transmission.

18. The user equipment of claim 12 wherein the processor is further configured to identify at least one transmission parameter comprising an identification of a frequency with which the packet transmission is performed, a result of the packet transmission, and timing related information, wherein the historical measurement information is generated to include the at least one transmission parameter.

19. A method, comprising:
at a user equipment including at least two antennas, the user equipment configured to communicate over a first connection:

determining whether historical measurement information includes at least a predetermined minimum amount of packet transmissions;

when the historical measurement information includes less than the predetermined minimum amount of packet transmissions, performing at least one further packet transmission until the historical measurement information includes at least the predetermined minimum amount of packet transmissions, wherein the historical measurement information is used, at least in part, to select one of the at least two antennas for an additional packet transmission, the historical measurement information indicating an expected performance associated with using the one of the at least two antennas for the additional packet transmission.

20. The method of claim 19, further comprising:

when the historical measurement information is less than the predetermined minimum number of packet transmissions, selecting a default antenna of the at least two antennas to perform the at least one further packet transmission.

\* \* \* \* \*